United States Patent [19]

Kato et al.

[11] 4,427,824

[45] Jan. 24, 1984

[54] METHOD FOR DISPERSING PIGMENTS

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 316,787

[22] Filed: Nov. 2, 1981

[30] Foreign Application Priority Data

Nov. 8, 1980 [JP] Japan ............................ 55-157289

[51] Int. Cl.³ .............................................. C08L 83/02
[52] U.S. Cl. ................................... 524/858; 524/547; 524/859; 524/860; 523/212
[58] Field of Search ............... 524/858, 859, 860, 861, 524/862, 863, 547; 523/212

[56] References Cited

U.S. PATENT DOCUMENTS

| 2,833,742 | 5/1958 | Koch | 524/860 |
|---|---|---|---|
| 3,382,205 | 5/1968 | Beers | 524/860 |
| 3,440,207 | 4/1969 | Nitzsche et al. | 523/212 |
| 4,013,611 | 3/1977 | Hechtl et al. | 524/862 |
| 4,100,129 | 7/1978 | Beers | 524/863 |
| 4,115,356 | 9/1978 | Hilliard | 524/862 |
| 4,196,273 | 4/1980 | Imai et al. | 524/862 |
| 4,221,693 | 9/1980 | Getson et al. | 523/212 |
| 4,357,443 | 11/1982 | White et al. | 524/860 |

FOREIGN PATENT DOCUMENTS

| 19290 | 11/1980 | European Pat. Off. | 524/858 |
|---|---|---|---|
| 2845540 | 4/1980 | Fed. Rep. of Germany | 524/858 |

Primary Examiner—Lewis T. Jacobs
Attorney, Agent, or Firm—Moonray Kojima

[57] ABSTRACT

A method of dispersing color fillers, wherein one or more hydrolyzable ester compound is added prior to or concurrently with the dispersing of the color fillers in a silyl group containing compound, whereby there is an unexpected enhancement of the storage stability of the silyl group containing compound having the color fillers dispersed therein. The resulting product is useful as paints, coatings, sealants, adhesives, primers, and the like.

5 Claims, No Drawings

METHOD FOR DISPERSING PIGMENTS

BACKGROUND OF THE INVENTION

1. Field of Invention

This invention relates to a method of dispersing color fillers in a compound containing hydrolyzable silyl groups, usable, for example, as paints, coatings, adhesives, sealants, primers, and the like; and more particularly, to such a method wherein an additive is employed in conjunction with the dispersing of the color fillers, whereby the storage stability of the sily group containing compound having the color filler dispersed therein, is greatly enhanced.

2. Description of the Prior Art

Compounds containing hydrolyzable silyl groups, are useful as paints, adhesives, coatings, sealants, primers, and the like. They may be mixed with appropriate coloring pigments and other fillers, as desired. They are particularly effective because of their properties of good adhesion to inorganic materials, due to their hydrolyzable silyl group, which forms a durable cured coating by cross linking at normal temperatures when contacted with moisture, such as contained in the ambient atmosphere. However, disadvantageously, such silyl group containing compounds have a tendency to react, during storage, with the small amount of water which may be contained in the stored system, thus resulting in a gradual increase in viscosity. More particularly, where a color filler, as herein defined, is incorporated in the stored system, this tendency to increase viscosity becomes more pronounced due to the water contained in such compounds or due to the water which adheres to the surface of the fillers. This sometimes leads to gelation. Thus, in the prior art, the storage stability of such silyl group containing compounds having color fillers dispersed therein leaves much to be desired. There is thus a distinct need in the art to improve the storage stability of such silyl group containing compounds having color fillers dispersed therein.

SUMMARY OF THE INVENTION

Accordingly, an object of the invention is to overcome the aforementioned and other deficiencies and disadvantages of the prior art.

Another object is to increase the storage stability of silyl group containing compound having color fillers dispersed therein.

The foregoing and other objects are attained by the invention which encompasses a method of dispersing color fillers, as defined herein, in a silyl group containing compound, as defined herein, which compound is useful as paints, coatings, adhesives, sealants, primers, and the like; wherein prior to or during the dispersal of the color fillers in the silyl group containing compound, a hydrolyzable ester compound, as defined herein, is added. More particularly, the color filler may be first added to the ester compound, or vice versa, then the two are added to the silyl group containing compound, and then dispersal is carried out. There are other ways of adding the one to the other prior to or concurrent with the dispersal. For example, the filler may be added to the ester or vice versa, then the two may be added to the silyl group containing compound during dispersal action. Another approach is to add the ester to the silyl group containing compound, and then adding the color filler to the two while carrying out the dispersal action. A still further way is to add the filler to the silyl group containing compound, and then adding the ester while concurrently carrying out the dispersal. The preferred procedure is to first combine the ester and filler, or vice versa, and then adding the two to the silyl group containing compound, and then effecting the dispersal action.

By controlling the time of addition of the hydrolyzable ester compound, that is prior to or concurrently with the dispersal, we have obtained a product which, surprisingly and unexpectedly, has greatly increased the storage stability of the silyl group containing compound having color fillers dispersed therein. Thus, the color filler dispersed product is especially useful commercially in paints, coatings, sealants, adhesives, primers, and the like, where storage is a problem. It was discovered by the inventors that surprising results were obtained by the addition of only hydrolyzable ester compound to the silyl group containing compound, prior to or concurrently with the dispersal of the color fillers therein. Other additives can be added for different purposes, however, the increase in storage stability, is the result of the adding of the hydrolyzable ester compound prior to or concurrently with the dispersal action.

DETAILED DESCRIPTION OF PREFERRED EMBODIMENTS

The hydrolyzable ester compound usable in this invention, is illustratively, one or more of the following: trialkyl orthoformates, such as trimethyl orthoformate, triethyl orthoformate, tripropyl orthoformate, tributyl orthoformate, etc; hydrolyzable organic silicon compounds of the formula: $R_{4-n}SiX_n$, wherein X is a hydrolyzable group, R is a monovalent organic group optionally containing a functional group, and n is an integer of 1,2,3, or 4, preferably 3 or 4; and partially hydrolyzed compounds thereof, such as methyl trimethoxysilane, methyl triethyoxysilane, ethyl trimethoxysilane, ethyltriethoxysilane, phenyl trimethoxysilane, phenyl triethoxysilane, vinyl trimethoxysilane, vinyl triethoxysilane, $\gamma$-methacryloxypropyl trimethoxysilane, $\gamma$-mercapto propyltrimethoxysilane, tetramethyl orthosilicate, ethyl silicate, tetrapropyl orthosilicate, tetra butyl orthosilicate, ethyl silicate 40, etc. The term "hydrolyzable ester compounds" cover such compounds.

The hydrolyzable ester compound is used in a ratio preferably of between 5:1 and 0.01:1 and more preferably between 2:1 and 0.01:1, as compared to the color filler, in terms of parts by weight. Having greater than 5 parts ester to 1 part filler is not productive. Moreover, there should be at least 0.01 part ester to 1 part of the filler, or there will be an insufficient effect.

The compounds containing hydrolyzable silyl groups, also referred to as silyl group containing compound, which are used in this invention, are not particularly restricted and may be compounds which contain in the molecule at least one silyl group of the general formula:

wherein $R_1$ is hydrogen or a monovalent hydrocarbon group selected from an alkyl group, an aryl group or an aralkyl group each having 1 to 10 carbon atoms, X is a group selected from alkoxy, hydroxyl, acyloxy, aminoxy, phenoxy, thioalkoxy ketoxymate, alkenyloxy, and amino groups, and a is an integer of 0,1 or 2. Examples of such compounds are as follows, and the term "silyl group containing compound" is intended to cover such examples:

Silane coupling agents, such as vinyl trimethoxysilane, vinyl triethoxysilane, γ-methacryloxytrimethoxysilane, γ-glycidoxypropyltrimethoxysilane, vinyltriacetoxysilane, γ-mercaptopropyltriethoxysilane, γ-aminopropyl triethoxysilane, etc, and silicone based primers which are the condensates or reactions products of the above:

Organopolysiloxanes which contain a hydroxyl group, an acetoxy group, an oxime group, an alkoxy group, etc, as the reactive group attached to the silicon and are used as condensation type cold curing silicone rubbers, silicone varnishes, silicone varnishes for paints, etc;

Modified silicone polymers, for example, silicone alkyl polymer, silicone polyester polymer, silicone acryl polymers, silicone epoxy polymer, silicone urethane polymer, etc, which are obtained by silicone modification by the reaction represented by

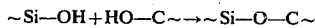

or

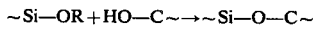

using an organic polymer containing a hydroxyl group and a silicone intermediate for modifying organic polymers by heating or in the presence of a Ti-based catalyst; and Silyl group containing polymers, for example, polyesters, vinyl type polymers, diallyl phthalate type polymers, diallyl phthalate type copolymers, etc, which contain in the molecule at least one silyl group of the general formula:

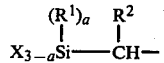

wherein $R^1$ and $R^2$ are each a monovalent hydrocarbon group selected from an alkyl group, an aryl group and an aralkyl group each having 1 to 10 carbon atoms, X is a group selected from alkoxy, hydroxyl, acyloxy, aminoxy, phenoxy, thioalkoxy ketoxymate, alkenyloxy and amino groups, and a is an integer of 0,1 or 2.

These silyl group containing polymers may be synthesized, for example, by hydrosilylating an organic polymer having a carboncarbon double bond at the terminal or in the side chain and a silicon hydride compound in the presence of a Pt-based catalyst by the reaction of

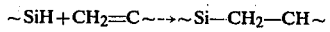

Polyesters containing a carbon-carbon double bond at the terminal or in the side chain may be obtained, for example, by reacting a hydroxyl group terminated polyester (Tradename: DESMOPHEN produced by Nippon Polyurethane Industry Co, Ltd) with allyl chloride in the presence of a base, such as sodium hydride, or by carrying out a condensation reaction between a dibasic acid and a diol by adding allyl glycidyl ether as a part of the diol component on synthesizing the polyester. Alternatively they may also be obtained by transesterification between a hydroxyl group terminated polyester and a diallyl ester such as diallyl phthalate in the presence of a transesterification catalyst such as toluene sulfonic acid. Further, they may also be obtained by condensing a diabasic acid and a diol under the excess acid component conditions and esterifying by adding allyl alcohol during or after the reaction. In addition, a polyester having an allyl type olefin group in the molecule may be obtained by reacting an acid anhydride an epoxy compound and an allyl type alcohol in the presence of a tertiary amino acid or quaternary ammonium salt, thereby achieving at the same time the molecular weight adjustment with the alcohol and the introduction of the allyl group, or also by using an epoxy compound and an allyl glycidyl ether. The polyester having a terminal acryloxy (or methacryloxy) group may be obtained by a known process by condensing a diol, a dibasic acid and acrylic acid (or methacrylic acid).

Diallyl phthalate type compounds having carbon-carbon double bonds include diallyl phthalate monomer or prepolymer thereof, and those usually commercially available can be employed. The copolymers of diallyl phthalate and an acrylic acid ester or a methacryllic acid ester may be obtained by polymerization using a polymerization initiator, such as an azo compound, a peroxide, etc; and the number of double bonds may be adjusted by changing the amount of diallyl phthalate used as the copolymer component.

Vinyl type polymers having carbon-carbon double bonds may be obtained by further partially radical copolymerizing allyl acrylate, allyl methacrylate or the like, on producing a homopolymer or a copolymer of vinyl type compounds such as styrene, alpha methylstyrene, acrylic acid and esters thereof, methacrylic acid and esters thereof, acrylamide, vinyl acetate, ethylene, maleic anhydride, etc.

As the silicon hydride compound, there may be mentioned halogenated silanes, such as trichlorosilane, methyldichlorsilane, dimethylchlorosilane, phenyldichlorosilane, etc; alkoxysilanes, such as trimethoxysilane, triethosysilane, methyldiethoxysilane, methyldimethoxysilane, phenyldimethoxysilane, etc; acyloxysilane, such as methyl-diacetoxysilane, phenyldiacetoxysilane, and triacetoxysilane; ketoxymate silanes, such as bis(-dimethylketoxymate)methylsilane, bis(cyclohexylketoxymate)methylsilane, etc; aminoxysilanes, such as triaminoxysilane, methyldiaminoxysilane, methyldiaminosilane, methyldiisopropenoxysilane, triisopropenoxysilane, etc; organopolysiloxanes having at least one Si-H or Si-X bond in the molecule, and etc. Where the halogenated silane is employed, this is converted into other hydrolyzable functional groups after hydrosilylation.

Further, as a process for synthesizing a silyl group containing polymer, it may be obtained by copolymerization of a vinyl group containing silyl compound such as vinyl trimethoxysilane, γ-methacryloxypropyltrimethoxysilane, γ-methacryloxypropylmethyldimethoxysilane, etc; and a vinyl compound, such as styrene, γ-methylstyrene, acrylic acid and esters thereof, methacrylic acid and esters thereof, acrylamide, vinyl acetate, ethylene, maleic anhydride, etc.

In addition, silicon containing polymers may also be obtained by reaction of an organic polymer having an epoxy group, such as epoxy polymer, a copolymer of glycidyl methacrylate and a vinyl type compound, etc, with γ-aminopropyltrimethoxysilane, or reaction of an organic polymer having a carboxylic acid, such as polyester, a vinyl type polymer, etc, with γ-glycidoxypropyltrimethoxysilane.

The silyl group containing compounds may be dissolved in an organic solvent, such as ethers, aliphatic hydrocarbons, aromatic hydrocarbons, and acetic esters.

As is known in the art, compounds containing hydrolyzable silyl groups are curable upon exposure to moisture, such as contained in ambient atmosphere. Thus, advantageously, the foregoing silyl group containing compounds, are useful in paints, sealants, adhesives, primers, coatings, etc.

The term "color filler" as used herein covers all types of pigments, coloring agents and other fillers which are used in paints, sealants, adhesives, coatings, primers, etc. For example, such color filler may be such color fillers as usually employed in conventional paints, coating agents, adhesives, sealants, primers, etc. Other examples of color fillers are such pigments as inorganic pigments such as ultramarine, Prussian blue, zinc yellow, Indian red, chrome yellow, white lead, titanium white, carbon black, transparent iron oxide, aluminum dust, etc; organic pigments such as azo type, triphenylmethane type, quinoline type, anthraquinone type, phthalocyanine type, etc; and fillers, such as silica, calcium carbonate, magnesium carbonate, clay, asbestos, mica, talc, graphite, zinc, zinc oxide, calcium oxide, molybdenum sulfide, glass fibers, etc.

The dispersing of the color fillers can be carried out using one or more of a number of different methods. For example, it is possible to employ a method commonly employed for dispersing conventional paints, coatings, adhesives, sealants, primers, etc, such as roll mill method, ball mill method, sand mill method, high-speed impeller mill method, disperser method, kneader method, etc. On dispersing the color filler in the silyl group containing compound, and addition of the ester compound as set forth herein, there is obtained, for example, a paint, a coating agent, a sealant, an adhesive, a primer, or the like, having excellent storage stability.

The hydrolyzable ester compound must be added prior to or concurrently with the dispersing action. For example, one preferred procedure is to first add the color fillers to the hydrolyzable ester compound, or vice versa, and then to add the two to the silyl group containing compound, and then carrying out the dispersing action. In other alternative methods, the filler may be added first to the ester compound, or vise versa, and the two added to the silyl group containing compound during dispersal action; or the ester compound may be first added to the silyl group containing compound, and then the filler added to the two concurrently with the dispersal action; or the filler may be added to the silyl group containing compound, and then adding the ester compound to the two concurrently with the carrying out of the dispersal. The important part of the invention is that the hydrolyzable ester compound be added prior to or concurrently with the dispersal of the color fillers in the silyl group containing compound. Adding the hydrolyzable ester compound after the color fillers are dispersed in the silyl group containing compound is not effective in enhancing the storage stability of the silyl group containing compound having color fillers dispersed therein.

The product obtained by this invention and containing the color fillers homogeneously and uniformly dispersed therein, forms an excellent resin at normal temperatures or by heating at which time a curing agent may be (although not necessarily) employed. In the event a curing agent is employed, one or more of the following are effective, carboxylic acid metal salts, such as alkyl titanate salts, tin octylate, dibutyltin dilaurate, lead octylate, etc; sulfide type and mercaptide type organic tin compounds, such as monobutyltin sulfide, dibutyltin dioctylmercaptide, etc; acidic catalyst, such as p-toluenesulfonic acid, phthalic acid, etc; amines, such as tetraethylenepentamine, triethylenediamine, N-β-aminoethyl-γ-aminopropyltrimethoxysilane, etc; alkaline catalysts, such as potassium hydroxide, sodium hydroxide, etc.

Furthermore, the color filler dispersed product obtained employing this invention, can be blended with various resins currently employed for paints, coating agents, adhesives, sealants, primers, etc. For example, it may be admixed with lacquer type resins, acryl lacquer type resins, thermosetting acrylic resins, resins, melamine resins, epoxy resins, etc, at appropriate proportions thereby further improving physical properties such as adhesion to the substrate, weather resistance of the resulting coating, etc.

The invention will now be more particularly illustrated with actual examples, which examples are not to be construed in any limiting sense.

Producing Silyl Group Containing Compounds

EXAMPLE 1

148 g of phthalic anhydride, 46.4 g of propylene oxide, 22.8 g of allyl glycidyl ether, 11.6 g of allyl alcohol, 0.5 g of dimethylbenzylamine were charged into a one liter metal autoclave and reacted at 100° C. Three hours later, 46 g of propylene oxide was added and the reaction was further effected for an hour, after which time, excess propylene oxide was removed to obtain a polyester of a molecular weight of 1200. In the examples, the molecular weight was measured by the osmatic method, or by the GPC method. To 100 g of the resulting polyester, was added 9.5 g of acetic anhydride to treat the hydroxyl groups in the polyester and reaction was effected at 120° C. for 2 hours, after which time, excess acetic anhydride was removed under reduced pressure. 22.2 g of hydroxyl group treated polyester, 0.0035 go of chloroplatinic acid and 8.65 g of methyl dichlorosilane were reacted at 80° C. for 2 hours, and then excess methyldichlorisilane was removed under reduced pressure. After reaction, 20 ml of methanol and 20 ml of methyl orthoformate were added and stirring was effected at room temperature for one hour, and low boiling substances were removed under reduced pressure to obtain a silyl group containing polymer.

EXAMPLE 2

100 g of a diallyl phthalate prepolymer (tradename: DAP L produced by Osaka Soda Co, Ltd: idoine value of about 80), 0.00001 g of chloroplatinic acid and one g of hydroquinone were dissolved in 100 ml of toluene. To this solution was added 35 ml of methyl diethoxysilane, and reaction was effected at 90° C. for 3 hours, to obtain a silyl group containing diallyl phthalate prepolymer.

EXAMPLE 3

To 100 g of toluene solvent heated at 90° C. was added dropwise a solution of 2 g of azobisisobutylonitrile in 30 g of styrene, 16 g of allyl methacrylate, 20 g of methyl methacrylate, 19 g of n-butyl methacrylate, 14 g of butyl acrylate, 2 g of maleic anhydride and 2 g of n-dodecylmercaptan, and reaction was effected for 10 hours, to obtain a vinyl type polymer containing an allyl type unsaturated group and having a molecular weight of 8,000. In the infrared absorption spectrum, an absorption at 1648 cm$^{-1}$ attributable to a carbon-carbon double bond was observed.

To 20 g of the obtained solution of allyl type unsaturated group containing vinyl copolymer, was added a solution of 15 g of trimethoxysilane and 0.0005 g of chloroplatinic acid in isopropanol and reaction was effected at 90° C. under closed conditions for 6 hours. In the infrared absorption spectrum of this product, absorption at 1648 cm$^{-1}$ had disappeared, and a silyl group containing vinyl type polymer was obtained.

EXAMPLE 4

Reaction was effected in a similar manner as in Example 3, except 16 g of the allyl methacrylate of Example 3, was replaced with 31 g of diallyl phthalate, to obtain a silyl group containing diallyl phthalate type polymer.

EXAMPLE 5

To 100 go of toluene solvent heated at 100° C. was added dropwise a solution of 2 g of azobisisobutyloni- trile in 30 g of styrene, 27 g of γ-methacryloxypropyl- trimethoxysilane, 20 g of methyl methacrylate, 19 g of n-butyl methacrylate, 14 g of butyl acrylate, 1 g of maleic anhydride and 2 g of n-dodecylmercaptan, and reaction was effected for 10 hours, to obtain a silyl group containing vinyl type polymer having a molecular weight of 9,000.

EXAMPLE 6

To 70 go of xylene heated at 90° C., was added dropwise a solution of 2 g of azobisisobutylonitrile in 30 g of styrene, 22 g of $CH_2=C(CH_3)COO(CH_2)_3Si(OCH_3)_3$, 22 g of methyl methacrylate, 15 g of n-butyl methacrylate, 18 g of butyl acrylate, 4 g of acrylamide and 10 g of n-butanol, and reaction was effected for 10 hours, to obtain a silyl group containing vinyl type resin having a molecular weight of 14,000.

Adding of Hydrolyzable Ester Compound

Using the silyl group containing compounds obtained in Examples 1-6, the color fillers indicated in Table 1, were treated and dispersed to obtain products having the fillers dispersed therein. The products were then diluted to appropriate viscosity and storage stability of each product having the color fillers dispersed therein, was measured, at 50° C. under closed conditions, initially and after one month. For the addition of hydrolyzable ester compound prior to dispersing, the color fillers were added to the ester compound, or vice-versa, and then the mixture of the two was added to the silyl group containing compound, and then dispersal was effected by ordinary method of dispersion. For addition of the hydrolyzable ester compound concurrent with the dispersal process, the color filler was added first to the ester or to the silyl group containing compound, and then the other component added during the dispersal action; or the ester was first added to the silyl group containing compound, and then the color filler was added during dispersal.

For comparison, for each example sample, the hydrolyzable ester compound was added after the dispersal of the color filler was completed in the silyl group containing compound, as shown in the Table 1. The storage stability was measured for each sample, in the comparison examples, and the results are shown in Table 1. It can be appreciated that the addition of hydrolyzable ester compound during or concurrently with the dispersal of the color fillers in the silyl group containing compounds, produces greatly enhanced storage stability of the product having the color fillers dispersed therein, and especially in comparison to the addition after completion of the dispersal.

TABLE 1 (PART 1)

| Example | Color Filler | Time of Addition, Additive(s) and Amounts. (Parts by weight per 100 parts by weight color filler) | | | Color Filler/Resin (solid basis) | Storage Stability (viscosity, cps) | |
|---|---|---|---|---|---|---|---|
| | | Before Dispersal | During Dispersal | After Dispersal | | Initial | After one month |
| Example 1 | Titanium Oxide | | Methyl Orthoformate (3) Methanol (5) | | 100/100 | 250 | 300 |
| Comp. Ex. 1 | Titanium Oxide | | | Methyl Orthoformate (3) Methanol (5) | 100/100 | 250 | 500 |
| Example 2 | Chrome Yellow | | Ethyl Silicate (15) | | 30/100 | 250 | 280 |
| Comp. Ex. 2 | Chrome Yellow | | | Ethyl silicate (15) | 30/100 | 250 | 700 |
| Example 3 | Titanium Oxide | Vinyltrimethoxy- silane (7) | | | 100/100 | 250 | 300 |
| Comp. Ex. 3 | Titanium Oxide | | | Vinyltrimethoxy- silane (7) | 100/100 | 250 | 650 |
| Example 4 | Titanium Oxide | | Methyl orthoformate (3) Methanol (10) | | 100/100 | 250 | 400 |
| Comp. Ex. 4 | Titanium Oxide | | | Methyl Orthoformate (3) Methanol (10) | 100/100 | 250 | 750 |
| Example 5 | Transparent Iron Oxide | Ethyl Silicate (50) Methanol (30) | | | 30/100 | 250 | 500 |
| Comp. Ex. 5 | Transparent Iron Oxide | | | Ethyl Silicate (50) Methanol (30) | 30/100 | 250 | 2,000 |
| Example 6 | Transparent Iron Oxide | | Methyltriethoxy- silane (14) | | 50/100 | 250 | 280 |
| Comp. Ex. 6 | Transparent Iron Oxide | | | Methyltriethoxy- silane (14) | 50/100 | 250 | 600 |

The foregoing description is illustrative of the principles of the invention. Numerous modifications and extensions thereof would be apparent to the worker skilled in the art. All such modifications and extensions are to be construed to be within the spirit and scope of the invention.

What is claimed is:

1. A method of dispersing color fillers, comprising the steps of adding hydrolyzable organic silicon containing ester compound and/or trialkyl orthoformate to a silyl group containing compound prior to or concurrently with dispersing of said color fillers in said silyl group containing compound, wherein said hydrolyzable organic silicon compound and/or trialkyl orthoformate is used in an amount of between 5 to 0.01 parts by weight per one part by weight of said color fillers, and wherein said silyl group containing compound is a vinyl polymer which contains in its molecule at least one silyl group of the formula:

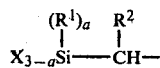

wherein $R^1$ and $R^2$ are each a monovalent hydrocarbon group selected from an alkyl group, an aryl group and an aralkyl group each having 1 to 10 carbon atoms, X is a group selected from alkoxy, hydroxyl, acryloxy, aminoxy, phenoxy, thioalkoxy, ketoxymato, alkenyloxyl, and amino groups and a is an integer of 0, 1 or 2.

2. The method of claim 1, wherein said hydrolyzable silicon containing ester compound and/or trialkyl orthoformate is used in an amount of between 2 to 0.01 parts by weight per one part by weight of said color filler.

3. The method of claim 2, wherein said hydrolyzable silicon containing ester compound and/or trialkyl orthoformate and said color filler were mixed together and then added to said silyl group containing compound, and then dispersal action was initiated thereafter.

4. The method of claim 3, wherein said color filler is a pigment.

5. The method of claim 1, wherein said hydrolyzable silicon containing ester compound and/or trialkyl orthoformate is added prior to dispersal of said color fillers.

* * * * *